No. 897,189. PATENTED AUG. 25, 1908.
G. BELLUZZO.
STUFFING BOX FOR ELASTIC FLUID TURBINES.
APPLICATION FILED NOV. 12, 1906.
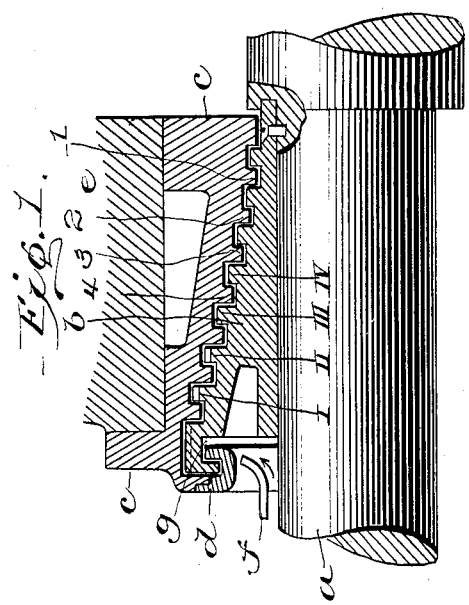
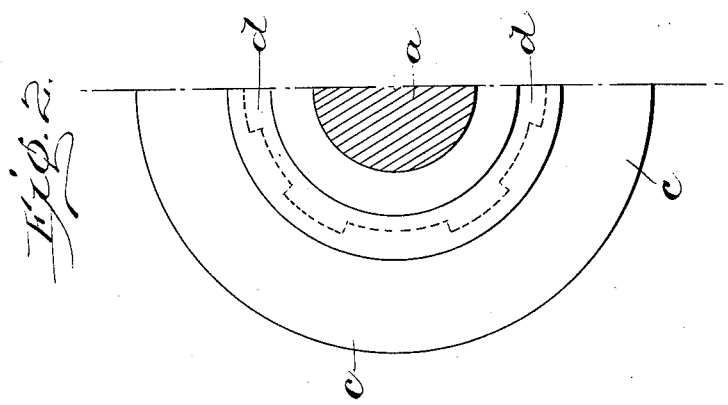

UNITED STATES PATENT OFFICE.

GIUSEPPE BELLUZZO, OF MILAN, ITALY.

STUFFING-BOX FOR ELASTIC-FLUID TURBINES.

No. 897,189.

Specification of Letters Patent.

Patented Aug. 25, 1908.

Application filed November 12, 1906. Serial No. 343,111.

*To all whom it may concern:*

Be it known that I, GIUSEPPE BELLUZZO, mechanical engineer, subject of the King of Italy, residing at 1 Via Paolo Frisi, Milan, Italy, have invented certain new and useful Improvements in Stuffing-Boxes for Elastic-Fluid Turbines; and I do hereby declare the following to be a full, clear, and exact description of the invention, such as will enable others skilled in the art to which it appertains to make and use the same.

The stuffing box for elastic fluid turbines which forms the object of the present invention is represented in Figures 1 and 2 of the accompanying drawing in longitudinal section and in front elevation respectively.

Upon the shaft —$a$—$a$— of the turbine a sleeve —$b$— presenting a tapering, stepped form is fixed. Projections 1, 2, 3, 4 on a box —$c$— enter channels formed between projections I, II, III, IV . . . on this sleeve with very slight play; this box is made in two parts and is fixed to the turbine casing —$e$—. The ring —$d$— which is also formed in several parts for constructional reasons is fitted to the box —$c$—. Some of the annular projections on the sleeve —$b$— are cut away as shown in broken lines in Fig. 2. Through the tube —$f$— water enters the groove —$g$— of the movable sleeve —$b$—. This water may be that which escapes from the distributer of the regulating servomotor or that arising from the condensations which collects in certain parts of the engine. The water is caused by the centrifugal force to adhere to the cylindrical wall of the groove —$g$— or of the internal channels in the box —$c$—. A tight joint is obtained owing to the action, in the direction, opposed to centrifugal force which tends to force the liquid outwards, of the air which tends to penetrate into the interior. The water which is ordinarily able to escape through the labyrinth formed by the various projections is very small in quantity and as on its discharge it has a temperature greater than that of the steam in the condenser, it becomes converted into steam.

The greater the velocity at the periphery in —$g$—, the smaller the number of the channels I, II . . . may be and therefore the smaller the length of the stuffing box.

Having now particularly described and ascertained the nature of my said invention and in what manner the same is to be performed, I declare that what I claim is:—

1. In a stuffing box for turbines, the combination, of two relatively rotative members having interrupted complementary surfaces co-acting to form an interior labyrinthian channel, and means for introducing hot water to said channel.

2. In a stuffing box for turbines, the combination, of two relatively rotative members having complementary conical surfaces co-acting to form an interior conical channel, and means for introducing fluid to said channel at its larger end.

3. In a stuffing box for turbines, the combination, of two relatively rotative members having interrupted complementary conical surfaces co-acting to form an interior labyrinthian channel, and means for introducing fluid to the said channel.

4. In a stuffing box for turbines, the combination, with an inner rotary member having an interrupted surface, of an outer member having an inner complementary surface, the two surfaces co-acting to form an interior labyrinthian channel, and means for introducing hot water to said channel.

5. In a stuffing box for turbines, the combination, with an inner rotary conical member having a surface interrupted in the direction of its axis, of an outer member having an inner complementary surface, the two surfaces co-acting to form an interior labyrinthian channel, and means for introducing fluid into the terminus of said channel.

6. In a stuffing box for turbines, the combination, with an inner rotary conical member having a surface interrupted in the direction of its axis by successive ribs and grooves occupying planes substantially at right angles thereto, of an outer member having an inner complementary surface, the two surfaces co-acting to form an interior labyrinthian channel, and means for introducing fluid to the inner terminus of said channel at the base of the cone.

7. In a stuffing box for turbines, the combination, with an inner member fixed to the rotor shaft and having an outer conical surface interrupted in the direction of its axis by a series of spaced ribs, of an outer stationary member having an inner surface complementary to that of the rotary member and co-acting therewith to form an interior labyrinthian conical channel, and means for introducing a fluid to the outer terminus of the channel.

8. In a stuffing box for turbines, the combination, with an inner member fixed to the rotor shaft and having an outer conical surface interrupted in the direction of its axis, by a series of spaced ribs and provided in its base with a recess, of an outer stationary member having an inner surface complementary to that of the rotary member, a flange carried by the outer member and projecting into the recess in the base of the inner member and interlocking with a portion of the inner member, the adjacent surfaces of the members co-acting to form an interior labyrinthian channel, and means for introducing a fluid to the channel by way of the recess.

9. In a stuffing box for turbines, the combination, with a rotary member tapering towards its inner end and having a surface interrupted in the direction of its axis, of an outer hollow member having an inner complementary surface, the two surfaces coacting to form an interior labyrinthian channel, and means for introducing a liquid to the outer terminus of said channel.

10. In a stuffing box for turbines, the combination, with an inner member fixed to the rotor shaft and having an outer conical surface tapering towards the turbine and interrupted in the direction of its axis by a series of spaced ribs and provided in its base with a recess, of an outer stationary member having an inner surface complementary to that of the rotary member, a flange carried by the outer member and projecting into the recess in the base of the inner member, the adjacent surfaces of the members coacting to form a labyrinthian channel leading from the recess to the turbine interior, and means for introducing a fluid to the outer terminus of the channel by way of the recess.

In testimony whereof I affix my signature to this specification, in the presence of two witnesses, this 25th day of October, 1906.

GIUSEPPE BELLUZZO.

Witnesses:
 BEARLO SALVOTIO,
 M. SIERSDORFER, Jr.